United States Patent [19]

Liao

[11] Patent Number: 5,469,110
[45] Date of Patent: Nov. 21, 1995

[54] CHARGE PUMPING CIRCUIT USING NON-OVERLAPPING CLOCK CONTROL

[75] Inventor: Tsuoe-Hsiang Liao, Hsinchu, Taiwan

[73] Assignee: Industrial Technology Research Institute, Hsinchu, Taiwan

[21] Appl. No.: 265,748

[22] Filed: Jun. 27, 1994

[51] Int. Cl.[6] ........................................ G05F 1/10
[52] U.S. Cl. .................................... 327/536; 327/306
[58] Field of Search ........................ 257/299; 307/109, 307/110; 327/156, 157, 239, 259, 306, 333, 390, 535, 536, 537, 589

[56] References Cited

U.S. PATENT DOCUMENTS

| | | | |
|---|---|---|---|
| 4,809,152 | 2/1989 | Bingham et al. | 307/110 |
| 5,095,223 | 3/1992 | Thomas | 307/110 |
| 5,237,209 | 8/1993 | Brewer | 307/110 |
| 5,306,954 | 4/1994 | Chan et al. | 307/110 |
| 5,341,031 | 8/1994 | Kinoshita et al. | |

*Primary Examiner*—Timothy P. Callahan
*Assistant Examiner*—Jeffrey Zwiezig
*Attorney, Agent, or Firm*—H. C. Lin

[57] ABSTRACT

A charge pumping circuit generates a negative voltage equal in magnitude to the positive supply voltage. A non-overlapping clock is used to set the voltage across a first capacitor equal to the positive supply voltage through a MOS switch. This stored voltage is then transferred to a second capacitor through a second MOS switch to generate a negative voltage at one terminal of the second MOS switch. The use of MOS switches eliminates the threshold voltage drop if MOS diodes were used to charge the first capacitor or to transfer the voltage from the first capacitor to the second capacitor.

5 Claims, 2 Drawing Sheets

5,469,110

CHARGE PUMPING CIRCUIT USING NON-OVERLAPPING CLOCK CONTROL

BACKGROUND

This invention relates to low supply voltage electronic circuits, particularly low power integrated circuits where a voltage higher than, or of opposite polarity to the supply voltage is required for proper operation.

Charge pumping circuits are used to generate a voltage with a magnitude larger than the supply voltage. FIG. 1 shows such a circuit commonly known as a voltage doubler. A signal generated from the OSCILLATOR appearing at point 1 is inverted by the inverter INV1. The inverted signal appearing at the output 2 of INV1 is a saturated signal with a magnitude approximately equal to the supply voltage Vcc of the oscillator. The inverted ac signal at point 2 charges CA to the peak value of the ac signal through the MOS diode MN2 during one half-cycle. During the other half-cycle CA discharges in series with the ac signal at point 2 through MOS diode MN1. Thus, the voltage at point 3 and VBB at point 4 are ideally equal to −Vcc.

This negative VBB can be added to the positive Vcc to obtain a voltage equal to the absolute sum of VBB and Vcc. However, due to the finite threshold voltage Vth of the MOS diodes, the voltage at point 3 is equal to (−Vcc+Vth) and the voltage VBB at point 4 is equal (−Vcc+2Vth). When the supply voltage Vcc is low, this negative voltage may not be sufficient.

SUMMARY

An object of this invention is to increase the output voltage of a voltage doubler. Another object of this invention is eliminate the threshold voltage drop of the MOS diodes used in a voltage doubler. Still another object of this invention is to obtain a negative voltage which is nearly equal in magnitude of the high-level positive supply voltage.

These objects are achieved in this invention by using two non-overlapping signals to control the charging and discharging of the capacitors used in the charge pumping circuits. The two capacitors are altenately charged through a delay circuit connected to an oscillator with two MOSFET switches controlled by the non-overlapping signals instead of two MOS diodes. Thus, each capacitor is fully charged to the high-level supply voltage without any threshold voltage loss, because the MOS switch has nearly zero voltage drop. The fully charged voltage across one capacitor is transferred to a second capacitor to obtain a negative voltage equal in magnitude to the high-level positive supply voltage.

DETAILED DESCRIPTION OF THE PREFERRED EMBODIMENT

Figure 1:
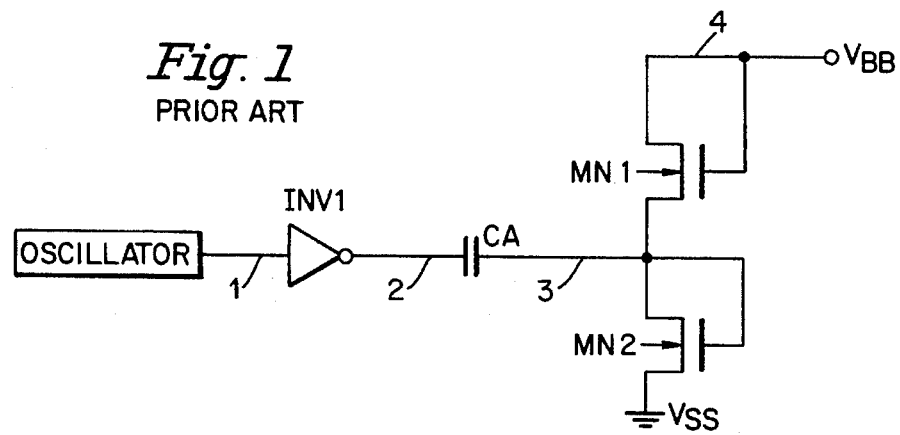
FIG. 1 shows a conventional charge pumping circuit for obtaining a negative voltage from a positive supply voltage.
Figure 2:
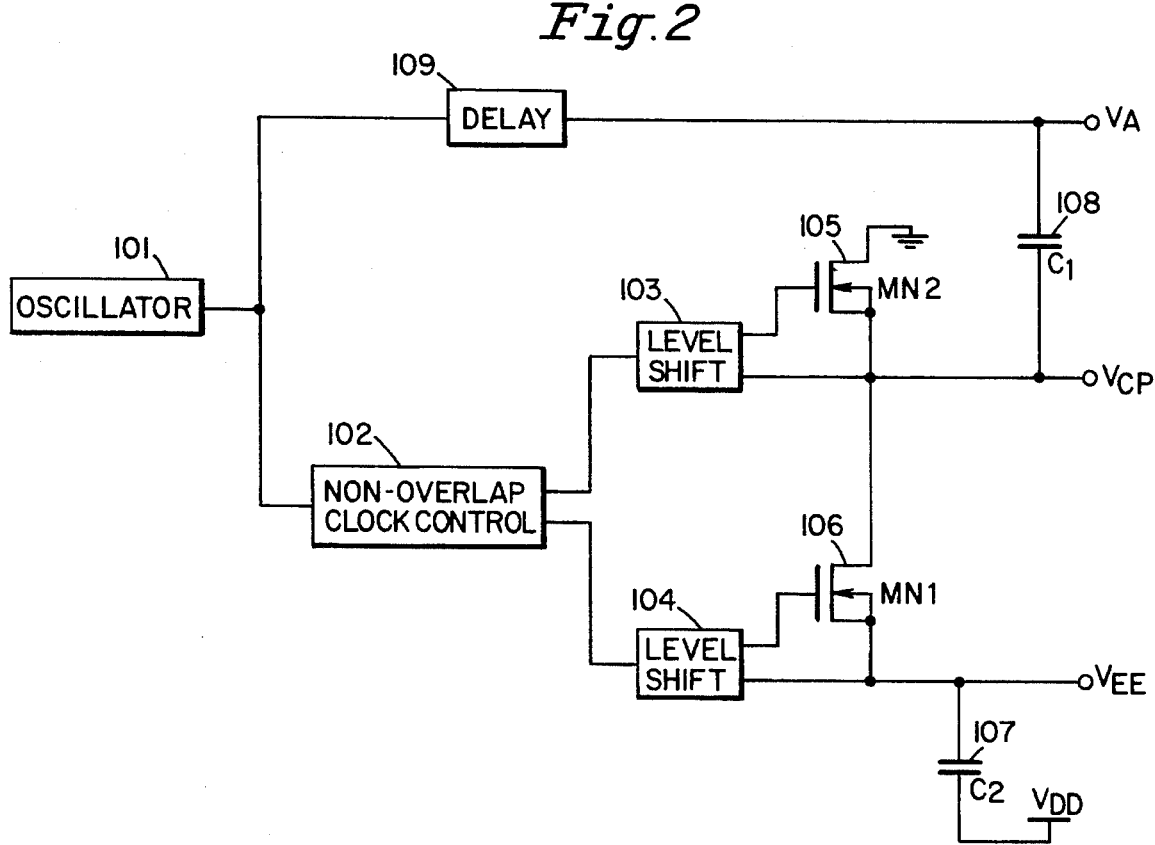
FIG. 2 shows the block diagram of the present invention.

FIG. 2 shows the block diagram of the present invention, including an oscillator 101, a delay circuit 109, a non-overlapping clock control circuit 102, level shifting circuits 103, 104, MOSFET switches 105, 106 and capacitors 107, 108.

In this preferred embodiment as shown in FIG. 2, the power supply voltage VDD is equal to Vcc. The oscillator 101 provides clock signals with a voltage swing between high level Vcc and low-level ground potential. The delay circuit 109 is connected between the oscillator 101 and the capacitor 108 for transmitting clock signals from the oscillator 101 and the capacitor 108. The other terminal of the capacitor 108 is connected to a NMOS switch 105 and a level shifter 103. The capacitor 107 is connected to a NMOS switch 106 and a level shifter 104. The other terminal of the capacitor 107 is connected to the power supply voltage VDD (=Vcc). The non-overlapping clock control circuit 102 generates two non-overlapping clock signals in response to the clock signals from the oscillator 101. The two non-overlapping clock signals are fed to level shifters 103 and 104 respectively to alternately turn on the switches 105 and 106. The charging and discharging of the capacitors 108 and 109 is controlled by the switches and the delayed oscillator clock signals. Finally, a negative terminal output voltage VEE equal to (−Vcc) is derived. Thus, the voltage difference (VDD−VEE) across the capacitor 107 is equal to two times Vcc.

When the output of the oscillator 101 changes from a low voltage to a high voltage, the following actions take place:

(1) The non-overlapping clock control circuit 102 is triggered to generate two non-overlapping signals levels, Vcc and ground potential, at its two output terminals respectively by the positive-going transition of the clock signal output from the oscillator 101.

(2) The low-level non-overlapping signal enters the level shifter 104 and turns off the NMOS switch 106. Then, the high-level non-overlapping signal enters the level shifter 103 and turns on the NMOS switch 105. Since the voltage drop across the NMOS switch 105 is zero, the terminal voltage Vcp is at ground potential. Herein, the level shifter 103 is utilized to shift the voltage levels, Vcc and ground potential, generated from the oscillator respectively to Vcc and Vcp; and the level shifter 104 is to shift the voltage levels, Vcc and ground potential, respectively to the levels Vcc and VEE.

(3) Meanwhile, the high signal from the oscillator also passes through a delay circuit 109 to obtain a peak terminal output voltage VA=Vcc. The delay is to synchronize signal VA with the signal processed through the non-overlapping clock control unit 102, the level shifter 103,104 and the switches 105, 106.

After the (1), (2), (3) steps, the capacitor 108 is charged to a value C1Vcc, and the terminal voltage VEE of the storage capacitor 107 remains at the same value derived in the last clock period since the NMOS switch 106 is off.

When the oscillator output goes from a high value to a low voltage, the following actions take place:

(4) The non-overlapping clock control circuit 102 is triggered to generate two non-overlapping signal levels with opposite polarities to those generated in step (1) by the negative-going transition of the clock signal output from the oscillator 101.

(5) The low-level non-overlapping signal first enters the level-shifter 103 and turns off the NMOS switch 105. Then, the high-level non-overlapping signal enters the level shifter 104 and turns on the NMOS switch 106.

(6) Then, the low signal from the oscillator passes through the delay circuit 109 to obtain a minimum terminal output voltage Va at ground potential.

After the steps (4), (5), (6), the capacitor 108 supplies charges to the capacitor 107. Since the voltage drop across the switch 106 is zero, the capacitor 108 continues to discharge the capacitor 107 until the terminal voltage at Vcp is equal to that at VEE. If the initial value of VEE derived from the last clock period is denoted VEE0, the final value of VEE after one clock cycle becomes $$VEE' = \frac{-C1Vcc + C2VEE0}{C1 + C2}$$

After a number of cycles of the oscillator, the value of VEE approaches that of −Vcc.

Figure 3:
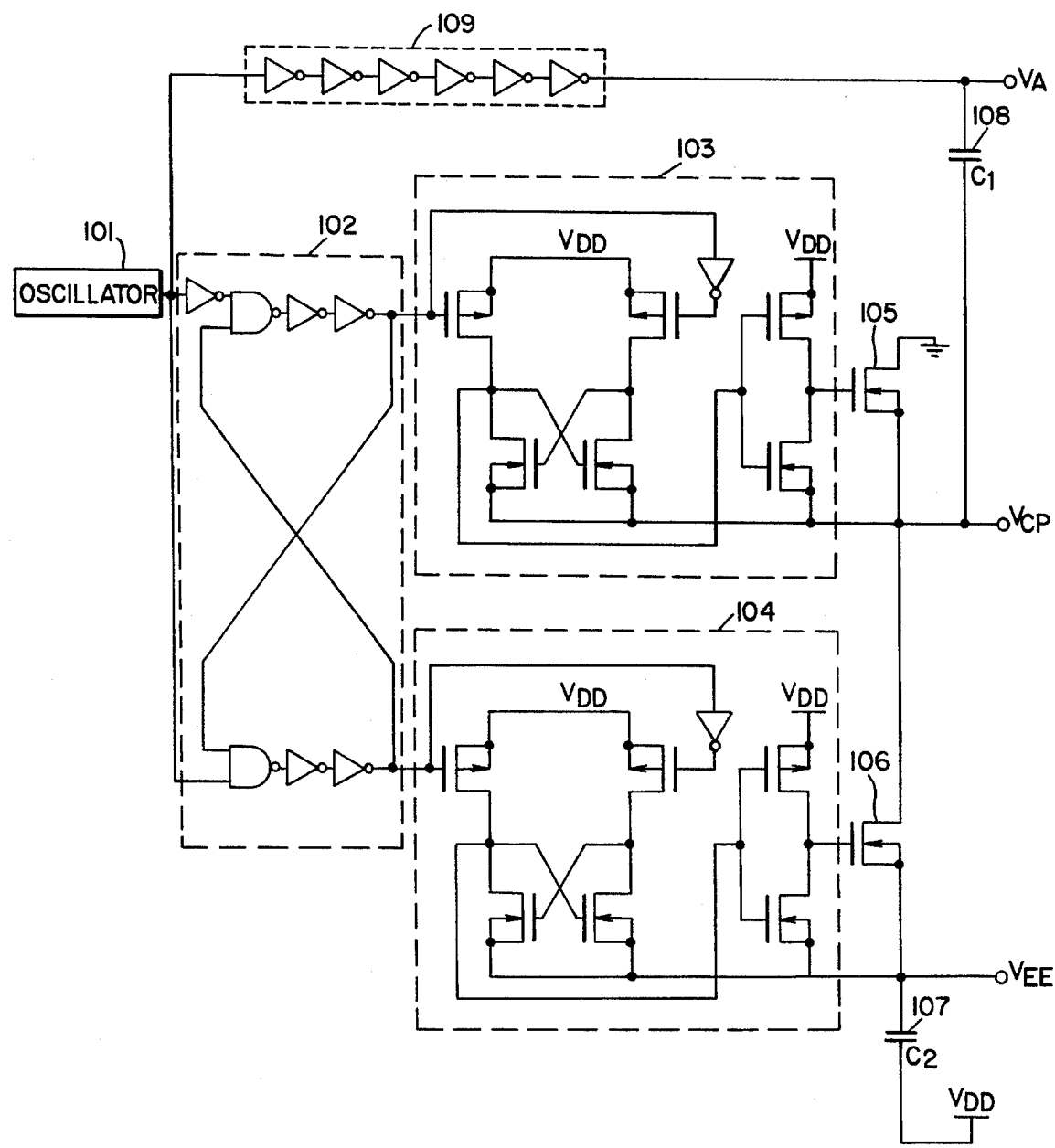
FIG. 3 shows the detailed circuit diagram of the present invention.

FIG. 3 shows the detailed circuit of the block diagram shown in FIG. 2. The non-overlapping clock control unit 102 includes a cross-coupled flip-flop with inverter delays to effect non-overlapping clocks. The clock control signals are then fed to the level shifters 103, 104. Each level shifter comprises a D flip-flop and a CMOS buffer. The delay circuit 109 comprises an even number of inverters.

While this embodiment describes a circuit to charge the storage capacitors through MOS switches and a delay circuit instead of MOS diodes, any method to charge the storage capacitors to the full supply voltage through MOS switches controlled by non-overlapping clock signals and a delay circuit is within the scope of this invention.

What is claimed is:

1. A charge pumping circuit for deriving a negative voltage equal in magnitude to a high-level positive supply voltage, comprising:

oscillator means for generating osicllatory clock signals having a first phase and a second phase in a clock period;

a non-overlapping clock control unit having a first and a second output terminals, said control unit generating two non-overlapping out-of-phase clock signals at said first and said second output terminals respectively in response to said oscillatory clock signals;

a first capacitor;

a charging and discharging means, controlled by said non-overlapping clock signals from said oscillator means, for charging said first capacitor to a voltage value equal to said high-level positive supply voltage during said first phase and discharging said first capacitor during said second phase;

a second capacitor having a negative voltage output terminal;

transferring means, controlled by said non-overlapping clock signals from said second output terminal, for maintaining a voltage value output at said negative voltage terminal during said first phase and transferring charges discharged from said first capacitor to said second capacitor during said second phase so that after a plurality of said oscillatory clock periods, said negative voltage is derived at said negative voltage output terminal of said second capacitor;

said charging and discharging means comprising delay means connected between said oscillator means and said first capacitor.

2. A charge pumping circuit as described in claim 1, further comprising: a first switch connected between said first capacitor and ground potential and controlled by said non-overlapping clock signals from said first output terminal of said non-overlapping clock control unit; and a first level shifting circuit connected between said first output terminal of said non-overlapping clock control unit and said first capacitor for shifting voltage levels of said non-overlapping clock signals from said output terminal of said non-overlapping clock control unit.

3. A charge pumping circuit as described in claim 1, wherein said delay means includes a series of inverters.

4. A charge pumping circuit as described in claim 1, wherein said transferring means comprises:

a second switch connected between said first capacitor and said second capacitor and controlled by said non-overlapping clock signals from said second output terminal of said non-overlapping clock control unit, and a second level shifting circuit connected between said second output terminal of said non-overlapping clock control unit and said second capacitor for shifting voltage levels of said non-overlapping clock signals from said second output terminal of said non-overlapping clock control unit.

5. A charge pumping circuit, as described in claim 1, wherein said non-overlapping control clock is generated by cross-coupling two logic gates cascaded with inverters and driven from an oscillating signal.

* * * * *